(12) United States Patent
Zhu et al.

(10) Patent No.: US 11,767,901 B2
(45) Date of Patent: Sep. 26, 2023

(54) TRANSMISSION, AND POWERED ACTUATOR USING THE SAME

(71) Applicant: JOHNSON ELECTRIC INTERNATIONAL AG, Murten (CH)

(72) Inventors: Yuefu Zhu, Shenzhen (CN); Hua Hu, Shenzhen (CN); Xiaowen Xian, Shenzhen (CN)

(73) Assignee: JOHNSON MEDTECH (HK) LIMITED, Shatin (HK)

( * ) Notice: Subject to any disclaimer, the term of this patent is extended or adjusted under 35 U.S.C. 154(b) by 0 days.

(21) Appl. No.: 18/098,927

(22) Filed: Jan. 19, 2023

(65) Prior Publication Data

US 2023/0228317 A1  Jul. 20, 2023

(30) Foreign Application Priority Data

Jan. 19, 2022 (CN) .......................... 202220145640.1

(51) Int. Cl.
*F16H 1/46* (2006.01)
*F16H 19/08* (2006.01)
*F16H 57/02* (2012.01)

(52) U.S. Cl.
CPC ............... *F16H 1/46* (2013.01); *F16H 19/08* (2013.01); *F16H 57/02* (2013.01); *F16H 2057/02034* (2013.01)

(58) Field of Classification Search
CPC . F16H 1/16; F16H 19/08; F16H 57/02; F16H 2057/02034
USPC .......................................................... 475/149
See application file for complete search history.

(56) References Cited

U.S. PATENT DOCUMENTS

| | | | | |
|---|---|---|---|---|
| 2013/0248303 A1* | 9/2013 | Okuno | ................... | F16D 55/36 188/67 |
| 2015/0101434 A1* | 4/2015 | Asano | ................... | F16H 57/033 74/416 |
| 2015/0226288 A1* | 8/2015 | Shizu | ................... | F16H 57/0486 475/333 |
| 2018/0058146 A1* | 3/2018 | Gråbæk | ................... | E21B 4/04 |

* cited by examiner

*Primary Examiner* — Colby M Hansen
(74) *Attorney, Agent, or Firm* — Aird & McBurney LP

(57) ABSTRACT

A transmission includes a transmission case provided with an internal gear an inner wall thereof and a multistage planetary gear mechanism housed in the transmission case. Each stage of the multistage planetary gear mechanism includes a retainer, a sun gear and a plurality of planetary gears mounted on the retainer. The plurality of the planetary gears in the last planetary gear stage of the multistage planetary gear mechanism includes four planetary gears annularly arranged between the corresponding sun gear and the inner gear in an uneven manner.

16 Claims, 10 Drawing Sheets

TRANSMISSION, AND POWERED ACTUATOR USING THE SAME

CROSS REFERENCE TO RELATED APPLICATIONS

This non-provisional patent application claims priority under 35 U.S.C. § 119(a) from Patent Application No. 202220145640.1 filed in The People's Republic of China on Jan. 19, 2022, the contents of which are hereby incorporated by reference in their entirety.

FIELD OF THE INVENTION

The invention relates to the field of medical instruments, in particular to a transmission, and a powered actuator using the same.

BACKGROUND

Surgical staplers are widely used in gastrointestinal surgery, hepatobiliary surgery, urological surgery, thoracic surgery and the like. The surgical staplers are helpful in reducing operation time and bleeding and beneficial to postoperative function recovery and the like. The surgical stapler become an essential medical instrument in the operation suturing process. In some application, the surgical staplers should be equipped with a powered actuator with high torque and high reduction ratio. However, when the reduction ratio is 600 or higher, a bearing capacity of the powered actuator cannot meet the requirement otherwise the size of the powered actuator is not small enough for some application requirements.

SUMMARY OF THE INVENTION

The present invention aims to provide a transmission, and a powered actuator using the transmission that can solve or at least alleviate the above-mentioned problems.

A transmission includes a transmission case provided with an internal gear an inner wall thereof and a multistage planetary gear mechanism housed in the transmission case, each stage of the multistage planetary gear mechanism includes a retainer, a sun gear and a plurality of planetary gears mounted on the retainer, the planetary gears of each stage of the multistage planetary gear mechanism are respectively meshed with the corresponding sun gear and the internal gear; the plurality of the planetary gears in the last planetary gear stage of the multistage planetary gear mechanism includes four planetary gears annularly arranged between the corresponding sun gear and the inner gear in an uneven manner, two of the four planetary gears at intervals are symmetrically arranged on opposite sides of the sun gear with a connection line, defined as line d connecting the rotation axes thereof, the other two of the four planetary gears are symmetrically arranged on opposite sides of the sun gear with a connection line, defined as line p, connecting the rotation axes thereof, the line d and line p satisfy the following conditions:

$$\theta_1 = K \Box \frac{360}{Z_a + Z_c}; \theta_2 = (K+1) \Box \frac{360}{Za + Zc} \text{ and, } K = \frac{Z_a + Z_c}{4} - 0.5,$$

wherein $\theta_1$ is first included angle formed between the line p and one side of the line d, $\theta_2$ is a second included angle formed between the line p and the other side of the line d, which is not equal to $\theta_1$, $Z_a$ is a teeth number of the sun gear, $Z_c$ is a teeth number of the internal gear.

A powered actuator includes a driving unit and the transmission described above, the driving unit includes an electric motor fixed to the transmission case, the electric motor includes a motor shaft engaged with the sun gear of the first planetary gear stage.

DETAILED DESCRIPTION OF THE PREFERRED EMBODIMENTS

Figure 1:
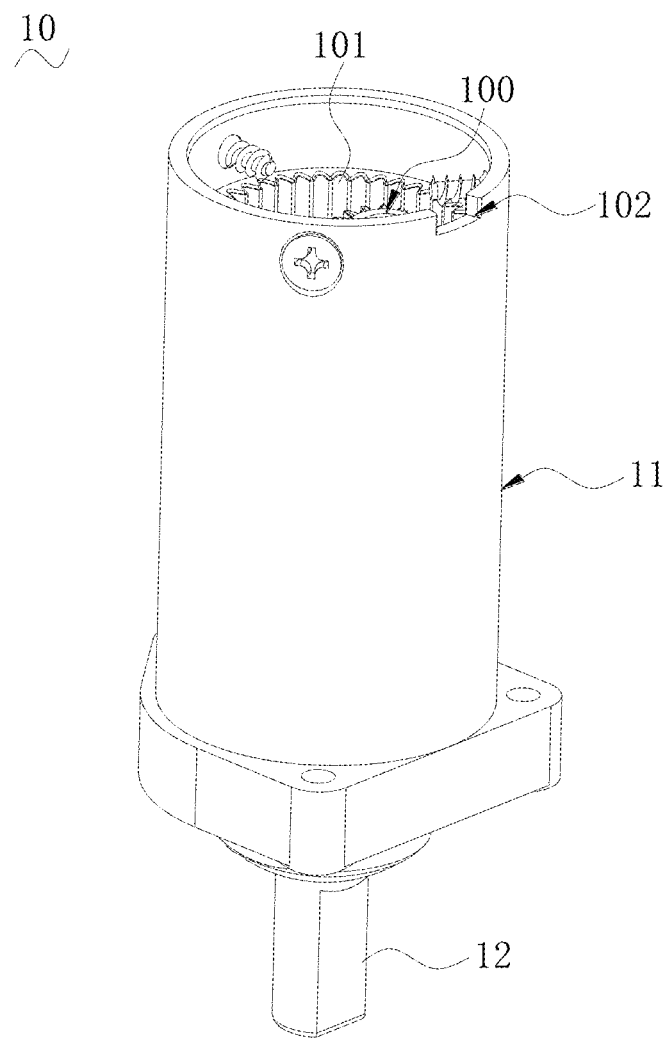
FIG. 1 is the perspective view of the transmission according to an embodiment of the present invention.

The present invention will be further described below based on the drawings and the embodiments.

Referring to FIGS. 1 to 4, a transmission 10 according to an embodiment of the present invention includes a transmission case 11 and a multistage planetary gear mechanism 100 housed in the transmission case 11. An internal gear 101 is provided on an inner wall of the transmission case 11. Each stage of the planetary gear mechanism includes a retainer 150, a sun gear 160 mounted on the retainer 150, and a plurality of planetary gears 170, and the planetary gears 170 of each stage of the planetary gear mechanism are respectively meshed with the corresponding sun gear 160 and the internal gear 101. The retainer 150 of the last stage of the planetary gear mechanism is fixedly connected with the output shaft 12.

The last stage of the planetary gear mechanism includes four planetary gears 170, annularly arranged between the sun gear 160 and the inner gear 101 in an uneven manner. Each two of the planetary gears 170 at intervals are symmetrically arranged on opposite sides of the sun gear 160, that is, the rotation axes the two planetary gears 170 and the sun gear 160 are parallel and coplanar. The planet gears 170 at intervals are symmetrically arranged to offset radial load to make the total radial load of all the planet gears 170 to be almost equal to zero. Therefore, better reliability of the transmission 10 is achieved even with more compact size. In present embodiment, the outer diameter of the transmission case 11 can be made to be 22 mm or even smaller to satisfy the requirements for various application.

The planetary gears 170 of the other stages (except for the last stage) of the planetary gear mechanism are arranged evenly between the corresponding sun gear 160 and the internal gear 101. Each planetary gear mechanism meets the conditions:

$$\frac{Z_a + Z_c}{N} = M,$$

Where: $Z_a$ represents teeth member of sun gear 160, $Z_c$ represents teeth member of the internal gear 101, N represents number of the planet gears 170 of each stage, and M is an integer. N is preferably 3 or 4, to guarantee equal loading among the planet gears and space limitation although systems with up to eight planet gears 170 in each stage are commercially available.

Figure 3:
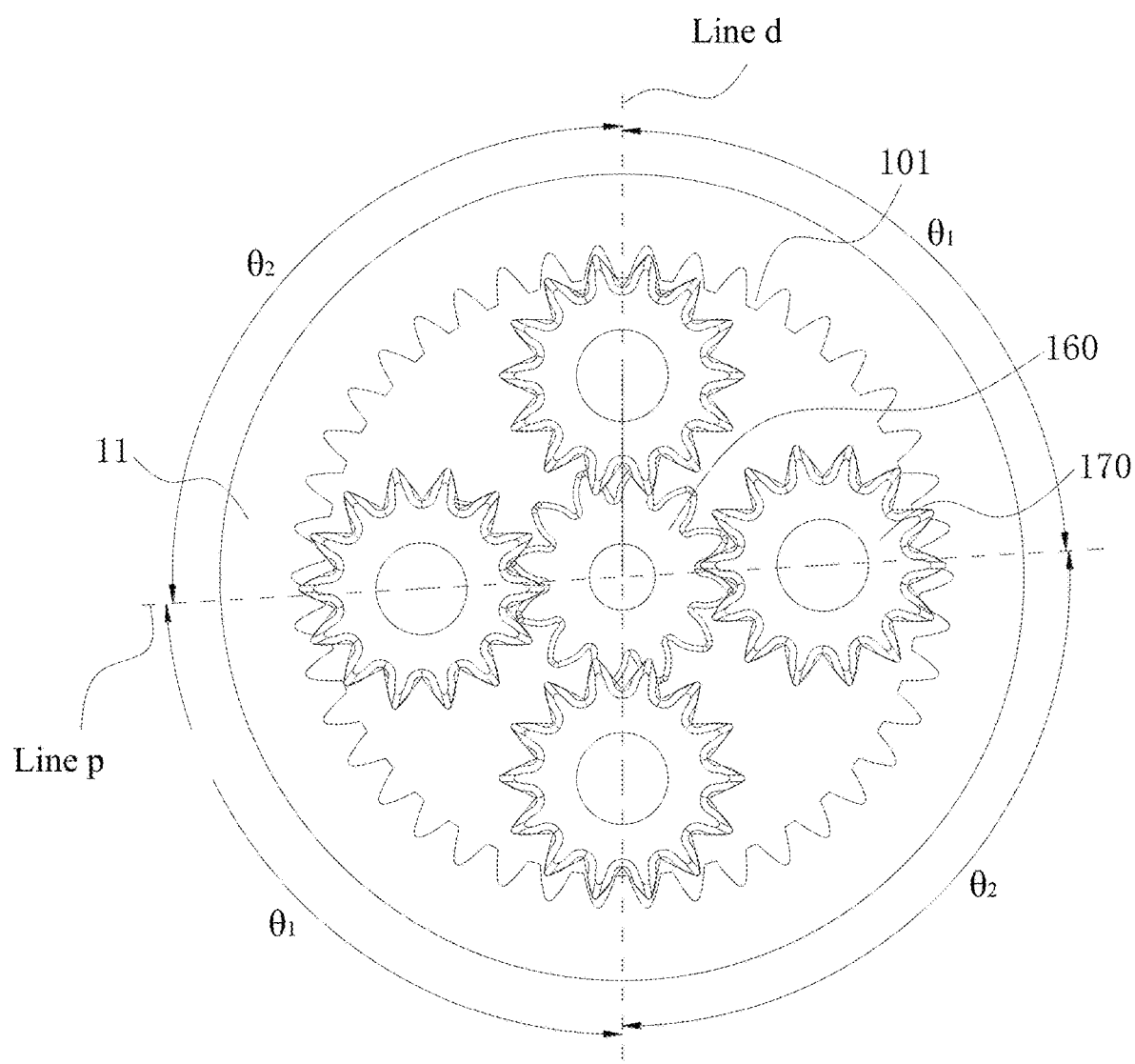
FIG. 3 is an axial end view showing the last stage of the planetary gear mechanism in the transmission of FIG. 1.

Referring also to FIG. 3, in the last stage of the planetary gear mechanism, a connection line connecting the rotation gear axes of two planetary gears 170 arranged symmetrically at intervals is defined as line d. Another connection line connecting the rotation axes of other two planetary gears 170 is defined as line p. The line d and line p satisfy the following conditions:

$$\text{Formula (1)}: \theta_1 = K \cdot \frac{360}{Z_a + Z_c};$$

$$\text{Formula (2)}: \theta_2 = (K+1) \cdot \frac{360}{Z_a + Z_c}; \text{ and}$$

$$\text{Formula (3)}: K = \frac{Z_a + Z_c}{4} - 0.5.$$

wherein $\theta_1$ is first included angle formed between the line p and one side of the line d. $\theta_2$ is a second included angle formed between the line p and the other side of the line d, which is not equal to $\theta_1$. $Z_a$ is a teeth number of the sun gear 160. $Z_c$ is a teeth number of the internal gear 101.

When the teeth number $Z_a$ of the sun gear 160 and the teeth number $Z_c$ of the internal gear 101 are determined, the parameter K can be obtained by formula (3). Then, the first included angle $\theta_1$ and the second included angle $\theta_2$ are obtain by formula (1) and formula (2) with the parameter K. The second included angle $\theta_2$ can also be obtained by subtracting the first included angle $\theta_1$ from 180 degrees.

In order to reduce categories of parts and cost, the planetary gears of the third and fourth stage of the planetary gear mechanism are identical, i.e. they have the same shape, structure, and teeth number. In general, if 3 or 4 planetary gears 170 can be arranged evenly in one stage of the planetary gear mechanism, a sum of the teeth number of teeth Za of the sun gear 160 and the teeth number $Z_c$ of the internal gear 101, divided by 12, is an integer. Therefore, the flexibility of gear ratio is greatly limited. For example, in present embodiment, the $Z_a$ is equal to 12, and $Z_c$ is equal to 42, three planet gears can be evenly arranged in one stage of the planetary gear mechanism. However, four planet gears can only be unevenly arranged in one stage. Therefore, there are four planet gears evenly arranged in the last stage of the planetary gear mechanism and three planet gears evenly arranged in the other stage of the planetary gear mechanism.

Figure 2:
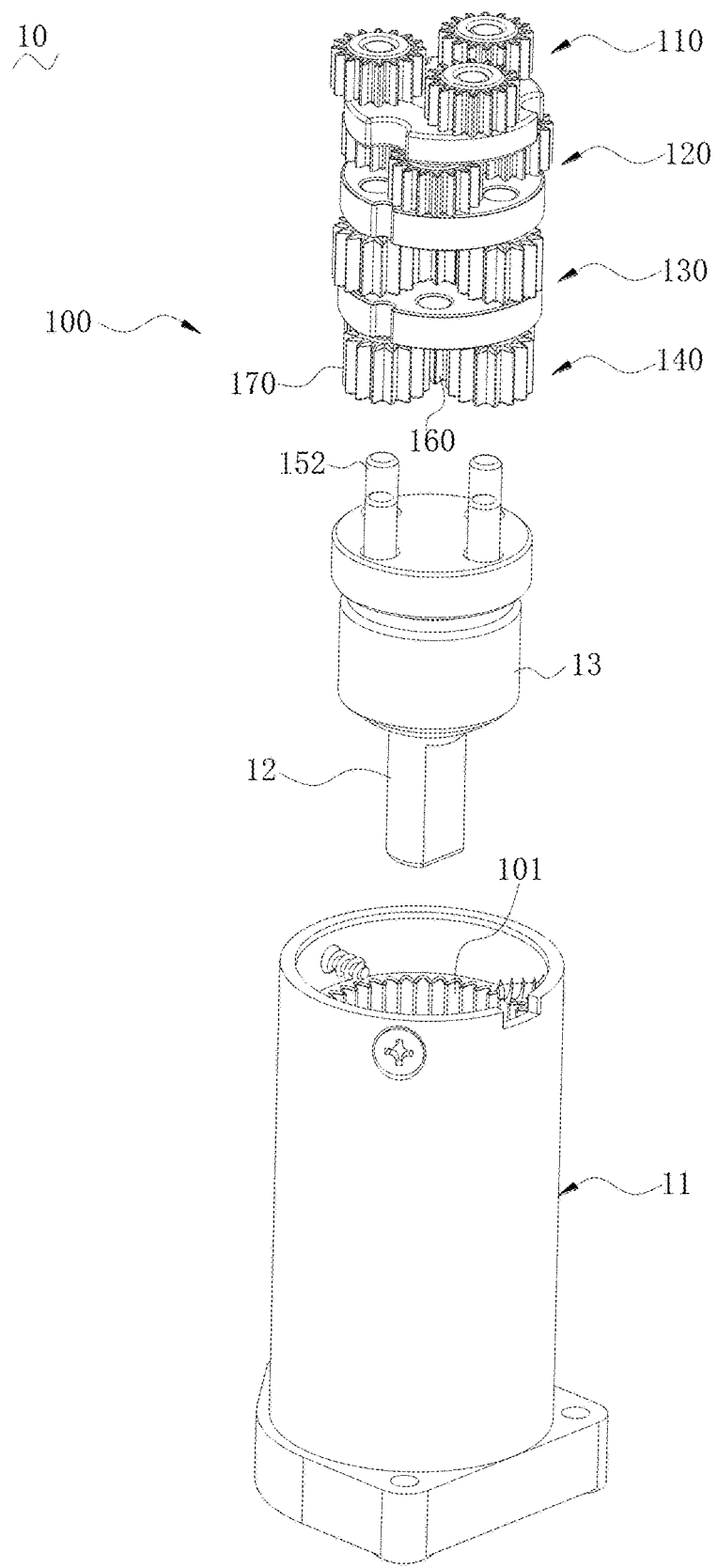
FIG. 2 is an explosion view of the transmission of FIG. 1.
Figure 4:
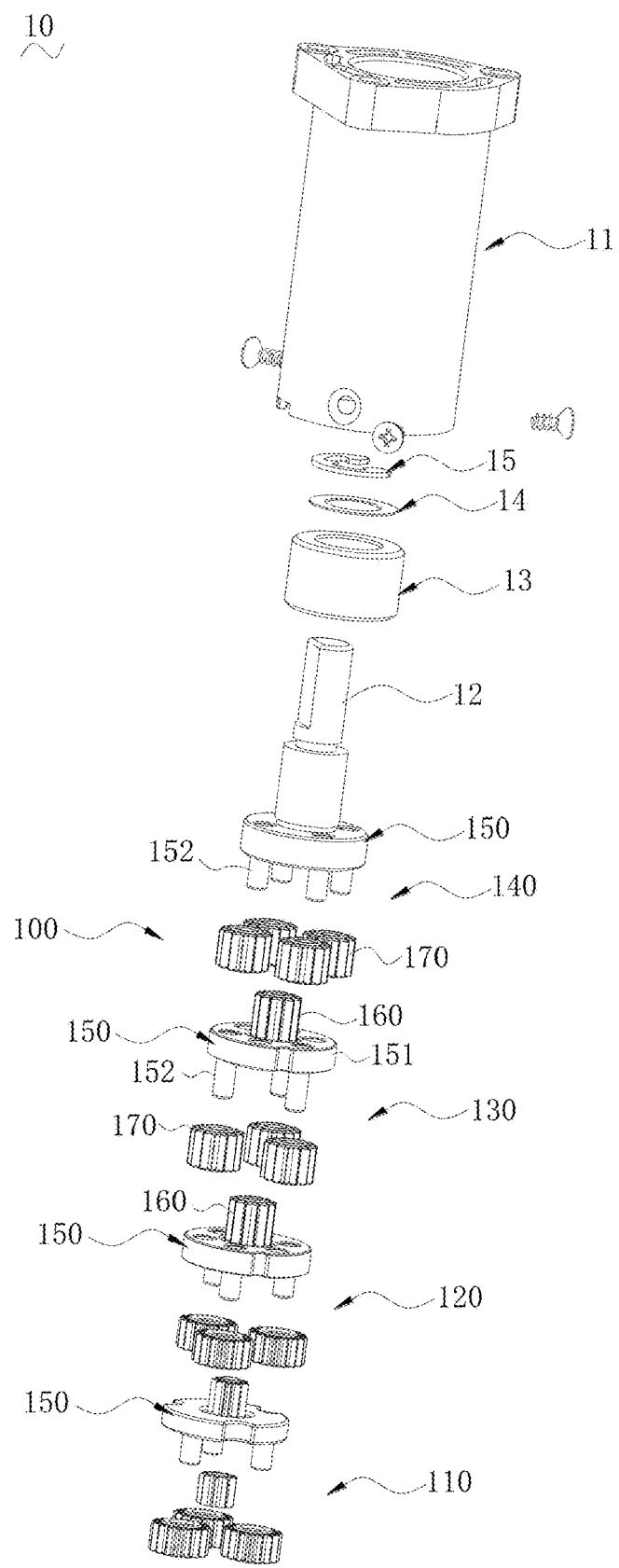
FIG. 4 is similar to FIG. 2 but shown in another aspect.

In one embodiment as shown in FIGS. 2 to 4, the planetary gear mechanism 100 is a four-stage planetary gear mechanism. The planetary gear mechanism 100 includes a first planetary gear stage 110, a second planetary gear stage 120 and a third planetary gear stage 130, each having three planetary gears 170, evenly arranged between the internal gear 101 and the sun gear 160.

That is, the first three stages of the four-stage planetary gear mechanism respectively have three evenly arranged planetary gears 170, the last or the fourth planetary gear stage 140 has four unevenly arranged planetary gears 170 with the total radial load of the four planets gears 170 being zero.

Specifically, each of the first planetary gear stage 110, the second planetary gear stage 120, and the third planetary gear stage 130 satisfies the following conditions:

$$\frac{Z_a + Z_c}{3} = W,$$

where W is an integer. Furthermore, when all stages of the planetary gear mechanism share the same $Z_a$ and $Z_c$, and each stage satisfies that $$\frac{Z_a + Z_c}{6} = S,$$

where S is an integer, the first three stages of the planetary gear mechanism respectively have three planetary gears 170 evenly arranged and the last or fourth stage has four planet gears unevenly arranged.

Preferably, the planet gears 170 in the third planetary gear stage 130 and the fourth stage planetary gear mechanism 140 have the same size and teeth number. The sun gears 160 in the third planetary gear stage 130 and the fourth stage planetary gear mechanism 140 also have the same size and teeth number, which helps to simplify the manufacturing and assembly of the transmission 10.

Preferably, a sum of the teeth number $Z_a$ of the sun gear 160 and the teeth number $Z_c$ of the internal gear 101 is equal to or greater than 48. Specifically, the sum is ranged from 48 to 150. Correspondingly, the first included angle $\theta_1$ is ranged from 86.25 to 88.8 degrees, and the second included angle $\theta_2$ is ranged from 91.2-93.75 degrees.

In one embodiment, when the teeth number $Z_a$, $Z_c$ are respectively 18 and 30. The sum of the teeth number $Z_a$, and $Z_c$ are equal to 48. Parameter K is obtained to be 11.5 according to the formula (3). The first included angle $\theta_1$ is obtained to be 86.25 degrees according to the formula (2). The second included angle $\theta_2$ is obtained to be 93.75 degrees according to the formula (3).

When the teeth number $Z_a$, $Z_c$ are respectively 18 and 36. The sum of the teeth number $Z_a$, and $Z_c$ are equal to 54. Parameter K is obtained to be 13 according to the formula (3). The first included angle $\theta_1$ is obtained to be 86.67 degrees according to the formula (2). The second included angle $\theta_2$ is obtained to be 93.33 degrees according to the formula (3).

When the teeth number $Z_a$, $Z_c$ are respectively 21 and 57. The sum of the teeth number $Z_a$, and $Z_c$ are equal to 78. Parameter K is obtained to be 19 according to the formula (3). The first included angle $\theta_1$ is obtained to be 87.69 degrees according to the formula (2). The second included angle $\theta_2$ is obtained to be 92.31 degrees according to the formula (3).

When the teeth number $Z_a$, $Z_c$ are respectively 19 and 53. The sum of the teeth number $Z_a$, and $Z_c$ are equal to 72. Parameter K is obtained to be 17.5 according to the formula (3). The first included angle $\theta_1$ is obtained to be 87.5 degrees according to the formula (2). The second included angle $\theta_2$ is obtained to be 92.5 degrees according to the formula (3).

When the teeth number $Z_a$, $Z_c$ are respectively 23 and 61. The sum of the teeth number $Z_a$, and $Z_c$ are equal to 84. Parameter K is obtained to be 20.5 according to the formula (3). The first included angle $\theta_1$ is obtained to be 87.85 degrees according to the formula (2). The second included angle $\theta_2$ is obtained to be 92.15 degrees according to the formula (3).

When the teeth number $Z_a$, $Z_c$ are respectively 28 and 68. The sum of the teeth number $Z_a$, and $Z_c$ are equal to 96. Parameter K is obtained to be 23.5 according to the formula (3). The first included angle $\theta_1$ is obtained to be 88.12 degrees according to the formula (2). The second included angle $\theta_2$ is obtained to be 91.88 degrees according to the formula (3).

When the teeth number $Z_a$, $Z_c$ are respectively 34 and 86. The sum of the teeth number $Z_a$, and $Z_c$ are equal to 120. Parameter K is obtained to be 29.5 according to the formula (3). The first included angle $\theta_1$ is obtained to be 88.5 degrees according to the formula (2). The second included angle $\theta_2$ is obtained to be 91.5 degrees according to the formula (3).

In one embodiment, a total reduction ratio of the planetary gear mechanism 100 is 650. A gear module of each of the planetary gears 170 is 0.4 mm. Other corresponding parameters, such as the teeth number, pitch circle diameter, etc., are configured according to the selected reduction ratio and gear module.

Referring to FIGS. 2 to 4, the retainer 150 includes a disc-shaped base 151 and a plurality of positioning posts 152 provided on the base 151 configured for the planetary gears 170 being respectively mounted thereon. The sun gear 160 and the base 151 of each stage of planetary gear mechanism are integrally formed and in coaxial with each other. The sun gear 160 and the plurality of positioning posts 152 respectively depend upon opposite sides of the base 151. One end of the output shaft 12 is fixedly to the retainer 150 of the last stage of the planetary gear mechanism. The retainer 150 of last stage of the planetary gear mechanism has four positioning posts 152. The retainers 150 of other stages of the planetary gear mechanism respectively have three positioning posts 152: a shaft sleeve 13, a gasket 14 and a resilient clip 15 are sleeved on the output shaft 12. The shaft sleeve 13 are tightly secured to the output shaft 12 by the resilient clip 15 and the gasket 14.

Figure 5:
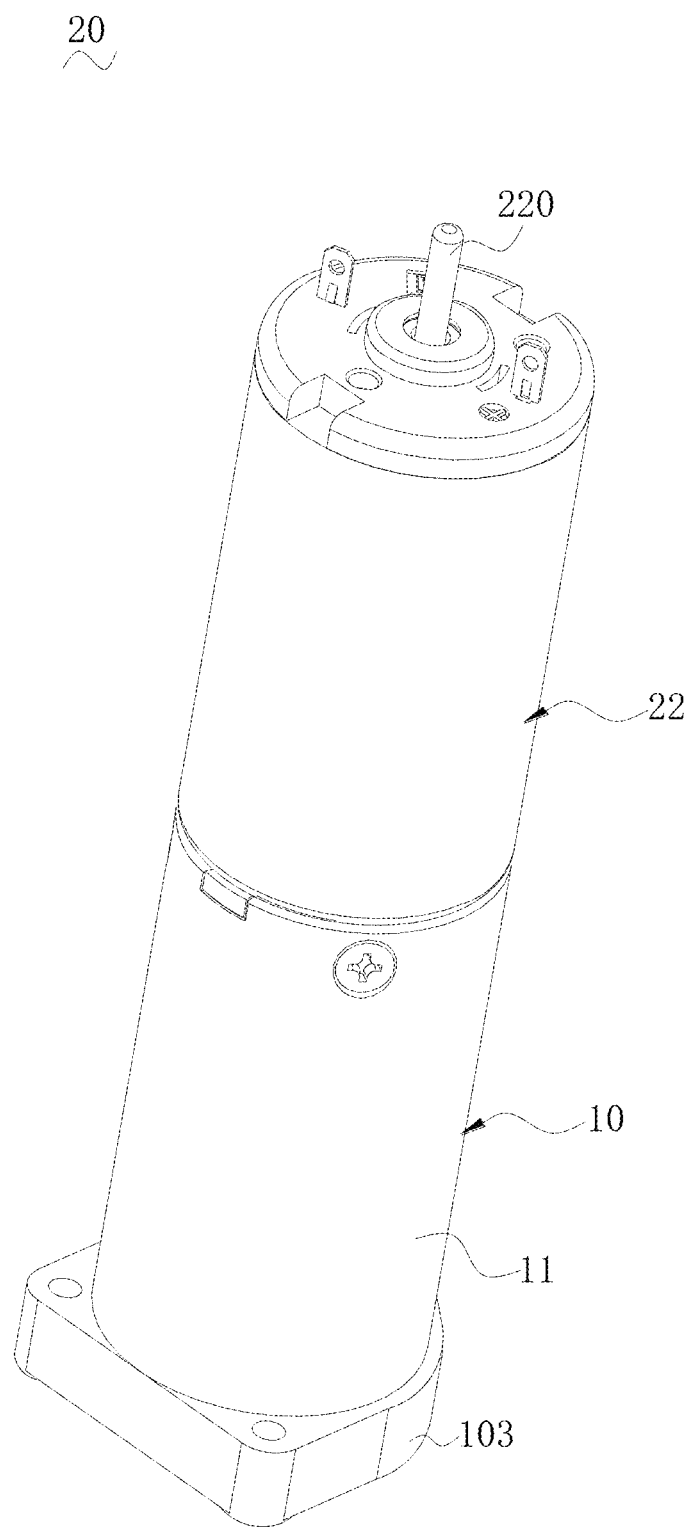
FIG. 5 is a perspective view of a powered actuator according to an embodiment of the present invention.
Figure 6:
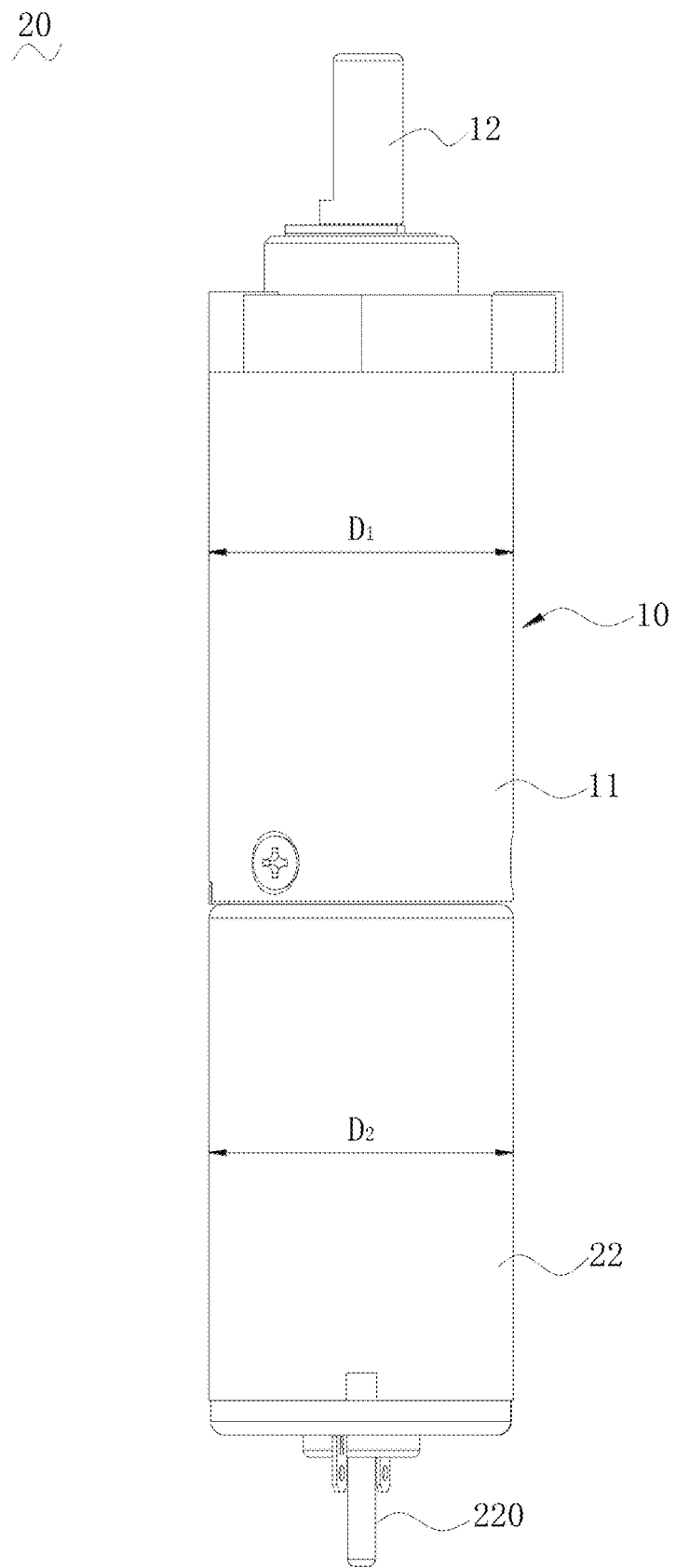
FIG. 6 is a side view of the powered actuator of FIG. 5.
Figure 7:
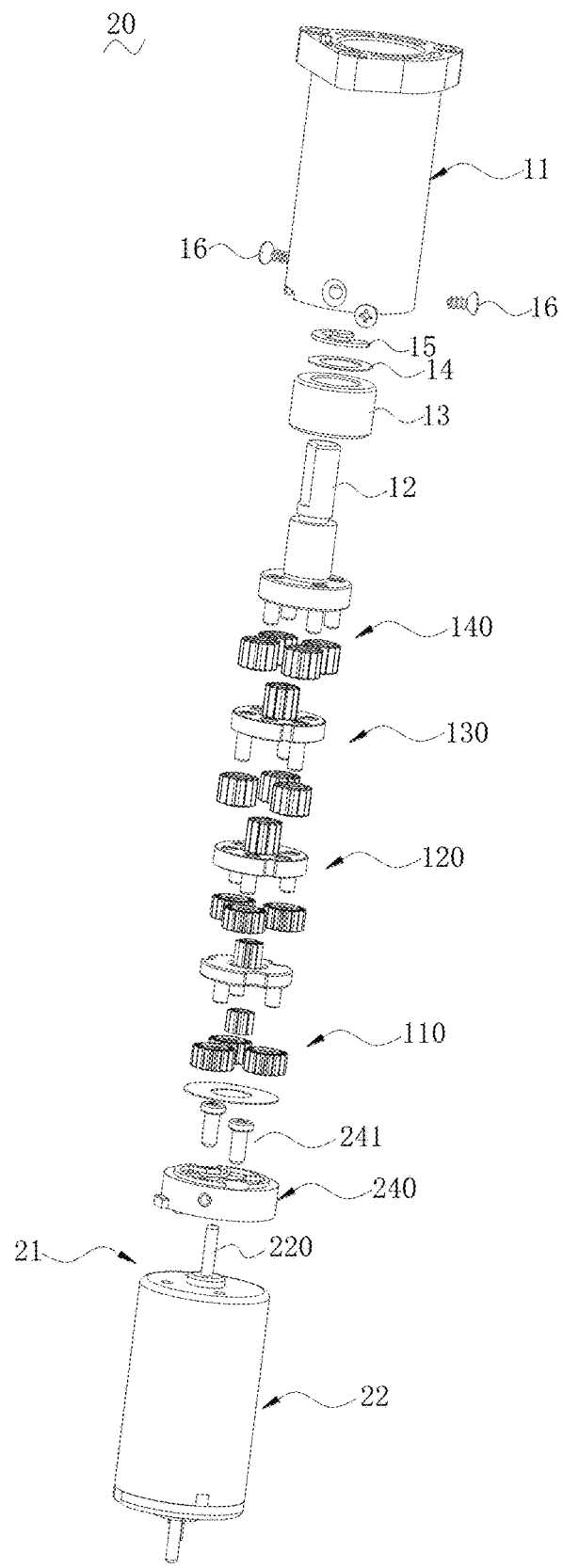
FIG. 7 is an exploded view of powered actuator of FIG. 5.

Referring to FIGS. 5 to 7, a powered actuator 20 according to an embodiment of the present invention includes a driving unit 21 and the transmission 10 according to one of the embodiments aforementioned. The driving unit 21 includes an electric motor 22, fixedly and coaxially connected to the transmission case 11. The diameter D2 of the electric motor 22 is equal to the outer diameter D1 of the transmission case 11. For example, the diameter D1 or D2 is 22 mm or smaller, therefore, the powered actuator 20 is compact in size. One end of the transmission case 11 away from the motor 22 is provided with a connecting seat 103 extending radially. The powered actuator is secured in place with screws engaged in the connecting seat 103. In assembly, the first planetary gear stage 110 is close to the motor 22. The last planetary gear stage is far from the motor 22.

Figure 8:
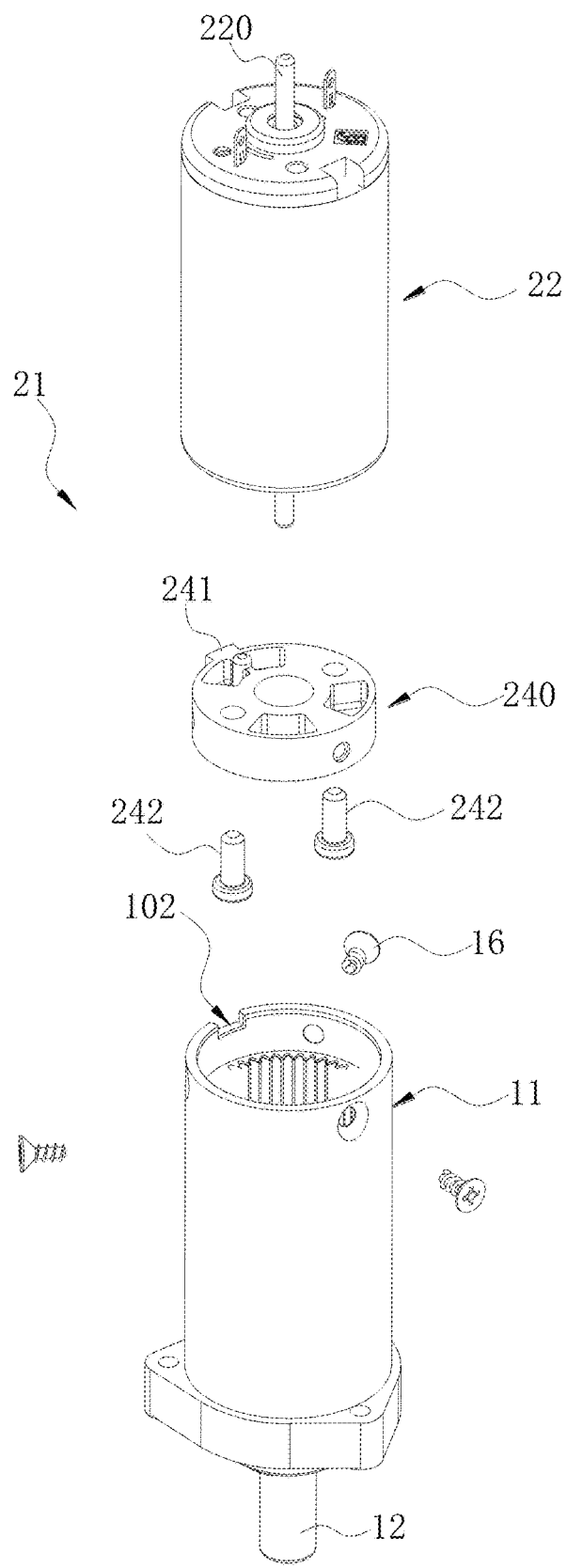
FIG. 8 is a partial exploded view of the powered actuator of FIG. 5.

Referring also to FIG. 8, the driving unit 21 further includes a mount 240 received in the transmission case 11. One end of the electric motor 22 is fixed to the mount 240 by screws 242. The transmission case 11 defines a notch 102, the outer side wall of the mount 240 is provided with a tab 241. The base 240 and the transmission case 11 are properly mated with each other with tab 241 engaged in the notch 102, and then the base 240 is secured to the transmission case 11 through a plurality of screws 16. The mount 240 defines a through hole. A motor shaft 220 of the electric motor 22 extends through the through hole of the mount 240 to be engaged with the sun gear 160 of the first planetary gear stage 110.

Figure 9:
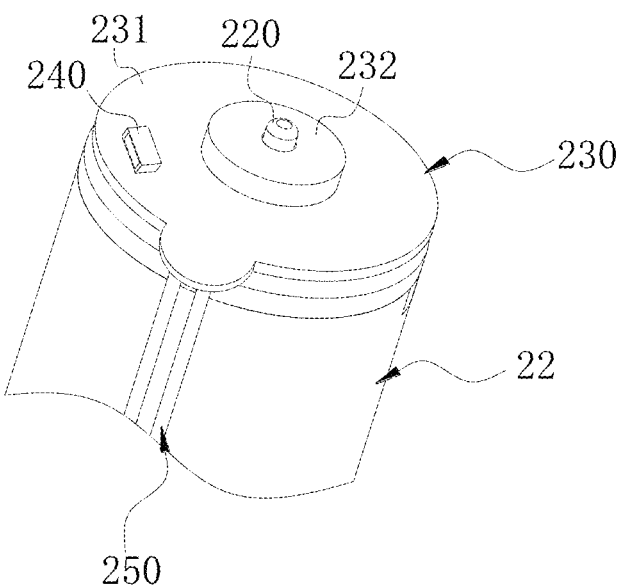
FIG. 9 is a partially enlarged view of the powered actuator according to another embodiment of the present invention.

Referring to FIG. 9, in one embodiment, a detection member 230 is disposed at an axial end of the electric motor 22. The detection member 230 is configured to detect the rotation speed and the rotation direction of the electric motor 22 in real time, thereby obtaining the work status of the powered actuator 20 to improve the operation safety thereof.

Figure 10:
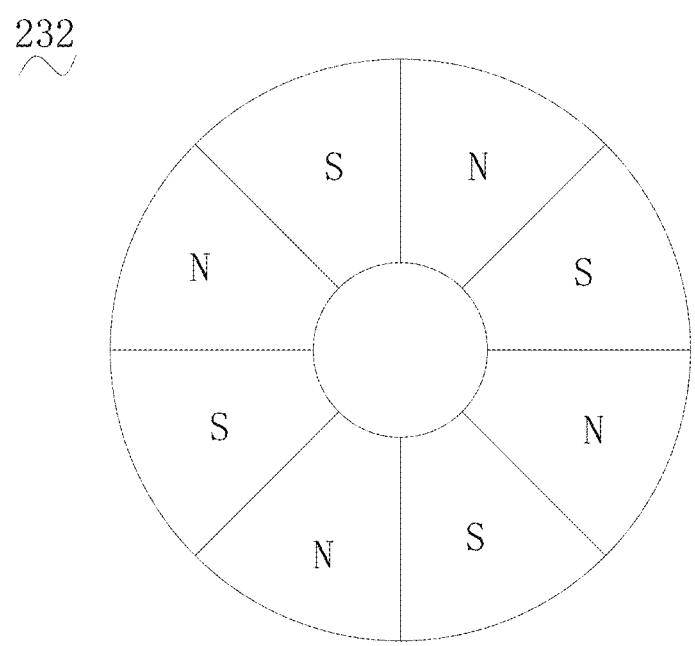
FIG. 10 is a schematic diagram of the magnetic ring of the powered actuator of FIG. 9.
Figure 11:
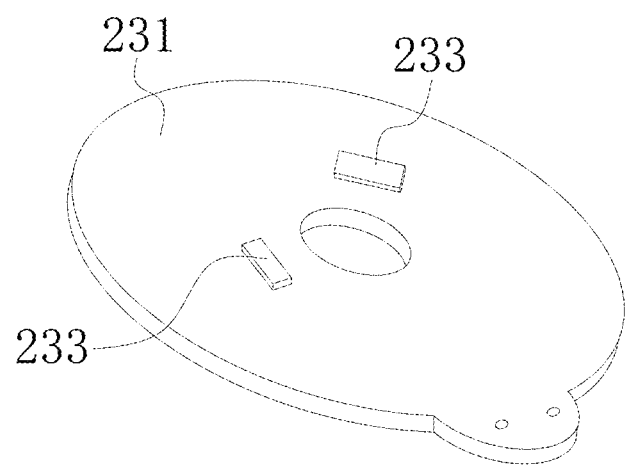
FIG. 11 is a schematic diagram of the circuit board of the powered actuator of FIG. 9.

Specifically, referring to FIGS. 9 to 11, the electric motor 22 has opposite first and second end surfaces, from which the motor shaft 220 extends. The first end surface is configured to be close to the transmission 10 and the second end surface is configured to be far from the transmission 10. The detecting member 230 includes a circuit board 231 and a magnetic ring 232. The circuit board 231 is fixed onto the second end surface of the electric motor 22. The magnetic ring 232 defines a plurality of N/S magnetic poles evenly alternatively arrayed in a circumferential direction. The magnetic ring 232 is fixed to the motor shaft 220, which extends through the circuit board 232. The magnetic ring 232 rotates synchronously with the motor shaft 220. A gap is kept between the circuit board 231 and the magnetic ring 232. Two Hall sensors 233 to collect signals of N/S magnetic poles are mounted on the circuit board 231 at interval. Therefore, the rotating direction, the rotating speed, and the number of rotating turns of the motor shaft 220 can be obtained.

The circuit board 231 is provided with a connector 240 on a side facing away from the motor 22. The connector 240 is electrically connect with the hall sensors 233. A flexible circuit 250 is electrically connected to circuit board 231 for power and signal transmission.

The operating voltage of the electrical motor 22 is 12V. The stall torque of the electrical motor 22 is 26 Nm, which is much higher than that of transmission in prior arts with only three planet gears in the last planetary gear stage. The powered actuator 20 of present embodiment can be repeatedly used for more than one hundred times under the torque of 7.2 Nm. However, most powered actuators in prior arts are disposable. Therefore, the powered actuator 20 of present embodiment is capable of meeting the application requirement of large torque as well as having better economy.

The powered actuator 20 described in the embodiment provided by the embodiment can be used in a surgical stapler with battery power.

Although certain inventive embodiments of the present disclosure have been specifically described, the present disclosure is not to be construed as being limited thereto. Various changes or modifications may be made to the present disclosure without departing from the scope and spirit of the present disclosure.

The invention claimed is:

1. A transmission, comprising :
   a transmission case provided with an internal gear an inner wall thereof;
   a multistage planetary gear mechanism housed in the transmission case, each stage of the multistage planetary gear mechanism comprising a retainer, a sun gear and a plurality of planetary gears mounted on the retainer, the planetary gears of each stage of the multistage planetary gear mechanism respectively meshed with the corresponding sun gear and the internal gear;
   wherein the plurality of the planetary gears in the last planetary gear stage of the multistage planetary gear mechanism comprises four planetary gears annularly arranged between the corresponding sun gear and the inner gear in an uneven manner, two of the four planetary gears at intervals are symmetrically arranged on opposite sides of the sun gear with a connection line, defined as line d connecting the rotation axes thereof, the other two of the four planetary gears are symmetrically arranged on opposite sides of the sun gear with a connection line, defined as line p, connecting the rotation axes thereof, the line d and line p satisfy the following conditions:

$$\theta_1 = K \square \frac{360}{Z_a + Z_c}; \theta_2 = (K+1) \square \frac{360}{Za + Zc} \text{ and, } K = \frac{Z_a + Z_c}{4} - 0.5,$$

wherein $\theta_1$ is first included angle formed between the line p and one side of the line d, $\theta_2$ is a second included angle formed between the line p and the other side of the line d, which is not equal to $\theta_1$, $Z_a$ is a teeth number of the sun gear, $Z_c$ is a teeth number of the internal gear.

2. The transmission of claim 1, wherein the multistage planetary gear mechanism is a four-stage planetary gear mechanism and comprises a first planetary gear stage, a second planetary gear stage and a third planetary gear stage, and a fourth planetary gear stage, the fourth planetary gear stage is the last planetary gear stage, the plurality of the planetary gears in each of the first to the third planetary gear stage of the multistage planetary gear mechanism comprises three evenly arranged planetary gears.

3. The transmission of claim 2, wherein a total reduction ratio of the planetary gear mechanism 100 is 650, a gear module of each of the planetary gears 170 is 0.4 mm.

4. The transmission of claim 1, wherein each of the first planetary gear stage, the second planetary gear stage, and the third planetary gear stage satisfies the following conditions:

$$\frac{Z_a + Z_c}{3} = W,$$

wherein W is an integer.

5. The transmission of claim 4, wherein all stages of the planetary gear mechanism share the same $Z_a$ and $Z_c$ and each stage satisfies that $$\frac{Z_a + Z_c}{6} = S,$$

where S is an integer.

6. The transmission of claim 5, wherein a sum of the teeth number $Z_a$ of the sun gear and the teeth number $Z_c$ of the internal gear is equal to or greater than 48.

7. The transmission of claim 6, wherein the sum is ranged from 48 to 150.

8. The transmission of claim 7, wherein the sum is 54, the first included angle $\theta_1$ is 86.67 degrees according to the formula (2), the second included angle $\theta_2$ is 93.33 degrees.

9. The transmission of claim 7, wherein the sum is 84, the first included angle $\theta_1$ is 87.85 degrees according to the formula (2), the second included angle $\theta_2$ is 92.15 degrees.

10. The transmission of claim 7, wherein the sum is 120, the first included angle $\theta_1$ is 88.5 degrees according to the formula (2), the second included angle $\theta_2$ is 91.5 degrees.

11. The transmission of claim 1, wherein an outer diameter of the transmission case is 22 mm.

12. A powered actuator comprising a driving unit and the transmission of claim 1, wherein the driving unit comprises an electric motor fixed to the transmission case, the electric motor comprises a motor shaft engaged with the sun gear of the first planetary gear stage.

13. The powered actuator of claim 12, wherein the driving unit further comprises a mount received in the transmission case, one end of the electric motor is fixed to the mount, the motor shaft extends through the mount.

14. The powered actuator of claim 12, wherein a detection member is disposed at an axial end of the electric motor.

15. The powered actuator of claim 14, wherein the electric motor has opposite first and second end surfaces, the motor shaft extends out of the first and second end surfaces, the detecting member includes a circuit board and a magnetic ring, the circuit board is fixed onto the second end surface of the electric motor, the magnetic ring defines a plurality of N/S magnetic poles evenly alternatively arrayed in a circumferential direction, the magnetic ring is fixed to the motor shaft, which extends through the circuit board, the magnetic ring rotates synchronously with the motor shaft, two Hall sensors to collect signals of N/S magnetic poles are mounted on the circuit board at interval.

16. The powered actuator of claim 15, wherein the circuit board is provided with a connector on a side facing away from the motor, the connector is electrically connected with the hall sensors, a flexible circuit is electrically connected to circuit board for power and signal transmission.

\* \* \* \* \*